(12) United States Patent
Budmiger

(10) Patent No.: US 10,215,602 B2
(45) Date of Patent: Feb. 26, 2019

(54) APPARATUS FOR MEASURING THE VOLUME FLOW OF A FLUID

(71) Applicant: Endress + Hauser Flowtec AG, Reinach (CH)

(72) Inventor: Thomas Budmiger, Oberwil (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 128 days.

(21) Appl. No.: 15/309,597

(22) PCT Filed: Apr. 20, 2015

(86) PCT No.: PCT/EP2015/058481
§ 371 (c)(1),
(2) Date: Nov. 8, 2016

(87) PCT Pub. No.: WO2015/176891
PCT Pub. Date: Nov. 26, 2015

(65) Prior Publication Data
US 2017/0146377 A1    May 25, 2017

(51) Int. Cl.
*G01F 1/60* (2006.01)
*G01F 1/58* (2006.01)

(52) U.S. Cl.
CPC ............... *G01F 1/60* (2013.01); *G01F 1/586* (2013.01)

(58) Field of Classification Search
CPC ............... G01F 1/58; G01F 1/68; G01F 1/60
See application file for complete search history.

(56) References Cited

U.S. PATENT DOCUMENTS

| | | | |
|---|---|---|---|
| 3,396,314 A | 8/1968 | Corson et al. | |
| 3,634,733 A | 1/1972 | Boyer | |
| 4,204,240 A | 5/1980 | Schmoock | |
| 4,784,000 A | 11/1988 | Gaertner | |

(Continued)

FOREIGN PATENT DOCUMENTS

| | | |
|---|---|---|
| CN | 1241714 A | 1/2000 |
| CN | 101542241 A | 9/2009 |

(Continued)

OTHER PUBLICATIONS

German Search Report, German Patent Office, Munich, DE, dated Jan. 28, 2015.

(Continued)

*Primary Examiner* — Jewel V Dowtin
(74) *Attorney, Agent, or Firm* — Bacon & Thomas, PLLC

(57) ABSTRACT

An apparatus for measuring volume flow of a fluid flowing through a measuring tube in the direction of its longitudinal axis, comprising a coil arrangement, at least two measuring electrodes coupling with the fluid and a control/evaluation unit, which in connection with the coil arrangement produces a magnetic field periodically changing its polarity and extending essentially transversely to the longitudinal axis of the measuring tube. The control/evaluation unit during a measuring phase at an essentially constant magnetic field determines the volume flow of the fluid in the measuring tube based on a voltage induced in the measuring electrodes. The control/evaluation unit supplies the coil arrangement with an overvoltage during a delay phase, and the delay phase begins at the point in time of the reversal of the polarity of the magnetic field and ends at the point in time of the beginning of the measuring phase. The control/evaluation unit supplies the coil arrangement with an essentially constant holding voltage over the duration of the measuring phase, wherein the control/evaluation unit controls the ratio of overvoltage to holding voltage to an essentially constant value.

10 Claims, 3 Drawing Sheets

(56) References Cited

U.S. PATENT DOCUMENTS

| | | | | |
|---|---|---|---|---|
| 6,031,740 | A * | 2/2000 | Budmiger | G01F 1/60 363/131 |
| 7,369,949 | B2 * | 5/2008 | Yamamoto | G01F 1/584 38/100 |
| 7,661,323 | B2 | 2/2010 | Budmiger | |
| 8,046,194 | B2 * | 10/2011 | Rufer | G01F 25/0007 702/184 |
| 8,714,027 | B2 * | 5/2014 | Drahm | G01F 1/58 73/861.12 |
| 8,933,709 | B2 * | 1/2015 | Volker | G01R 27/22 324/654 |
| 9,983,035 | B2 * | 5/2018 | Dabrowski | G01F 1/582 |

FOREIGN PATENT DOCUMENTS

| | | |
|---|---|---|
| CN | 101636640 A | 1/2010 |
| DE | 10312058 A1 | 9/2004 |
| DE | 102012105716 A1 | 1/2014 |
| DE | 102012107534 A1 | 2/2014 |
| DE | 102014107200 A1 | 11/2015 |
| EP | 0969268 A1 | 1/2000 |
| EP | 1899684 A1 | 3/2008 |
| GB | 2032625 A | 5/1980 |
| WO | 2007033697 A1 | 3/2007 |
| WO | 2014026841 A1 | 2/2014 |

OTHER PUBLICATIONS

International Search Report, EPO, The Netherlands, dated Sep. 1, 2015.

English Translation of the International Preliminary Report on Patentability, WIPO, Geneva, CH, dated Dec. 1, 2016.

Chinese Office Action issued in corresponding Chinese Application No. 201580026321.1, dated Sep. 19, 2018.

* cited by examiner

APPARATUS FOR MEASURING THE VOLUME FLOW OF A FLUID

TECHNICAL FIELD

The invention relates to an apparatus for measuring volume flow of a fluid flowing through a measuring tube in the direction of its longitudinal axis.

BACKGROUND DISCUSSION

Magneto-inductive flow measuring devices utilize the principle of electrodynamic induction for volumetric flow measurement: Charge carriers of the fluid moved perpendicularly to a magnetic field induce a voltage in measuring electrodes likewise arranged essentially perpendicularly to the flow direction of the fluid. This voltage induced in the measuring electrodes is proportional to the flow velocity of the medium averaged over the cross section of the measuring tube; it is thus proportional to the volume flow.

In the ideal case, the electrical current curve in the coil arrangement corresponds to the curve of the magnetic field. Due to eddy currents, which arise during the reversal of the magnetic field in the pole shoes and cores of the coil arrangement, there occur in the real case deviations from the ideal case. The coil current measured outside of the coil arrangement corresponds, consequently, to the sum of the electrical current flowing in the coil arrangement and the electrical current produced by the eddy currents. If the electrical current measured outside of the coil arrangement is used as control variable, thus, indeed, the electrical current is constant, not, however, the magnetic field. This holds until the eddy currents have decayed.

In order to remove this drawback, it is provided in European patent, EP 0 969 268 A1 that the electrical current is not used directly for controlling the voltage across the coil arrangement. For rapidly reversing the direction of the magnetic field, an overvoltage is applied to the coil arrangement for a rise time during the reversing of the magnetic field. The duration the overvoltage is successively so set that the electrical current maximum is achieved upon expiration of the rise time, so that no further rise of the coil electrical current occurs. After reaching the maximum, the coil current asymptotically approaches the electrical current end value. In the solution known from the state of the art, the magnetic field has upon reaching the electrical current maximum a constant magnetic field end value corresponding to the constant electrical current desired value. The duration of the reversal phase is given by the characteristic of the coil current. Since the stability of the measurement signal is degraded by, among other things, also the inductive in-coupling from the coil arrangement to the measuring electrodes, during the measuring of the voltage difference between the measuring electrodes, both the voltage is across the coil arrangement as well as also the electrical current through the coils must be constant. In the case of the solution known from the state of the art, this is, due to the asymptotic approach to the end value, only the case once the eddy currents have completely decayed. In summary, the above cited EP 0 969 268 A1 describes an indirect control of the B-field by means of applying an essentially constant overvoltage.

Disadvantageous in the case of the above mentioned solution is that the rise time of the coil current can have a relatively strong dependence on process- and/or environmental conditions. In the case of a change of the rise time, unavoidably also the time between the end of the rise time and the beginning of the following measuring phase changes. Not completely decayed disturbance signals between the coil arrangement and the measuring electrodes, which are usually of a capacitive nature, influence the measured variables. The holding voltage depends on the resistance of the coil arrangement and on the desired electrical current. In such case, the holding voltage is defined as product of the resistance and the desired electrical current. Since the resistance is temperature dependent, in the case of constant overvoltage, the holding voltage changes. Since the overvoltage is usually not controlled, also fluctuations of the overvoltage can lead to an uncontrolled change of the rise time. As a result of the above mentioned influence of the environmental- and/or process conditions, fluctuations of the measured voltage difference between the measuring electrodes are experienced and, as a result thereof, fluctuations of the zero point of the magneto-inductive flow measuring device. Zero point instability lessens the accuracy of measurement and the reproducibility of the measurements of the magneto-inductive flow measuring device.

SUMMARY OF THE INVENTION

An object of the invention is to assure an improved stability of the zero point in the case of a magneto-inductive apparatus, respectively in the case of a magneto-inductive method, for measuring volume flow.

The object is achieved relative to the apparatus by features including that the control/evaluation unit supplies the coil arrangement with an overvoltage during a delay phase, wherein the delay phase begins at the point in time of the reversal of the polarity of the magnetic field and ends at the point in time of the beginning of the measuring phase, and that the control/evaluation unit supplies the coil arrangement with an essentially constant holding voltage over the duration of the measuring phase, wherein the control/evaluation unit controls the ratio of overvoltage to holding voltage to an essentially constant value. The apparatus comprising a coil arrangement, at least two measuring electrodes coupling with the fluid and a control/evaluation unit, which in connection with the coil arrangement produces a magnetic field periodically changing its polarity and extending essentially transversely to the longitudinal axis of the measuring tube, wherein the control/evaluation unit during a measuring phase at an essentially constant magnetic field determines the volume flow of the fluid in the measuring tube based on a voltage induced in the measuring electrodes. The at least two measuring electrodes are coupled galvanically or capacitively with the fluid. Preferably, the coil arrangement includes two diametrally arranged coils usually with, in each case, an integrated coil core. Depending on embodiment, also only one coil with or without coil core can be provided, or there can be more than two coils, in each case, with or without coil core inserted. Corresponding measuring devices are referred to as magneto-inductive flow measuring devices. Furthermore, the invention relates to a corresponding method.

In an advantageous embodiment of the apparatus of the invention, the control/evaluation unit controls the ratio of overvoltage to holding voltage to an essentially constant value by a corresponding change of the overvoltage. Alternatively, the control/evaluation unit controls the ratio of overvoltage to holding voltage to an essentially constant value by holding the duration of the delay phase to an at least approximately constant value.

An advantageous embodiment of the magneto inductive flow measuring-device provides that the predetermined value of the ratio of overvoltage to holding voltage is greater than 1. Preferably, the predetermined value of the ratio of overvoltage to holding voltage lies between 2 and 10. The predetermined value depends especially on the desired measuring speed and/or applied sensor type of the magneto-inductive flow measuring device and/or on the application, in which the sensor type is applied.

If a high measuring speed is desired—, for example, because the volume flow exhibits a high dynamic range—, then the predetermined value of the ratio should be as high as possible: The higher the overvoltage, the smaller is the duration of the delay phase and the faster measured values can be produced in sequential measuring phases. Preferably, the control/evaluation unit in the case of an application, in which due to a high dynamic range a high measuring speed is required, selects the predetermined value of the ratio of overvoltage to holding voltage as high as is possible in the context of the available power.

Furthermore, an advantageous embodiment of the magneto-inductive flow measuring device provides that the control/evaluation unit in the case of an application, which is located in an explosion endangered region, selects the predetermined value of the ratio of overvoltage to holding voltage sufficiently low that the power consumption allowable for the explosion endangered region is not exceeded.

A favorable form of embodiment of the solution of the invention provides a memory unit, in which predetermined values for the ratio of overvoltage to holding voltage are furnished as a function of the respective sensor type and/or the respective application and/or the desired accuracy of measurement.

The object is achieved as regards method by features including that the coil arrangement is supplied with an overvoltage during a delay phase, wherein the delay phase begins at the point in time of the reversal of the polarity of the magnetic field and ends at the point in time of the beginning of the measuring phase, and that the coil arrangement is supplied with an essentially constant holding voltage over the duration of the measuring phase, wherein the ratio of overvoltage to holding voltage is controlled to an essentially constant value.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
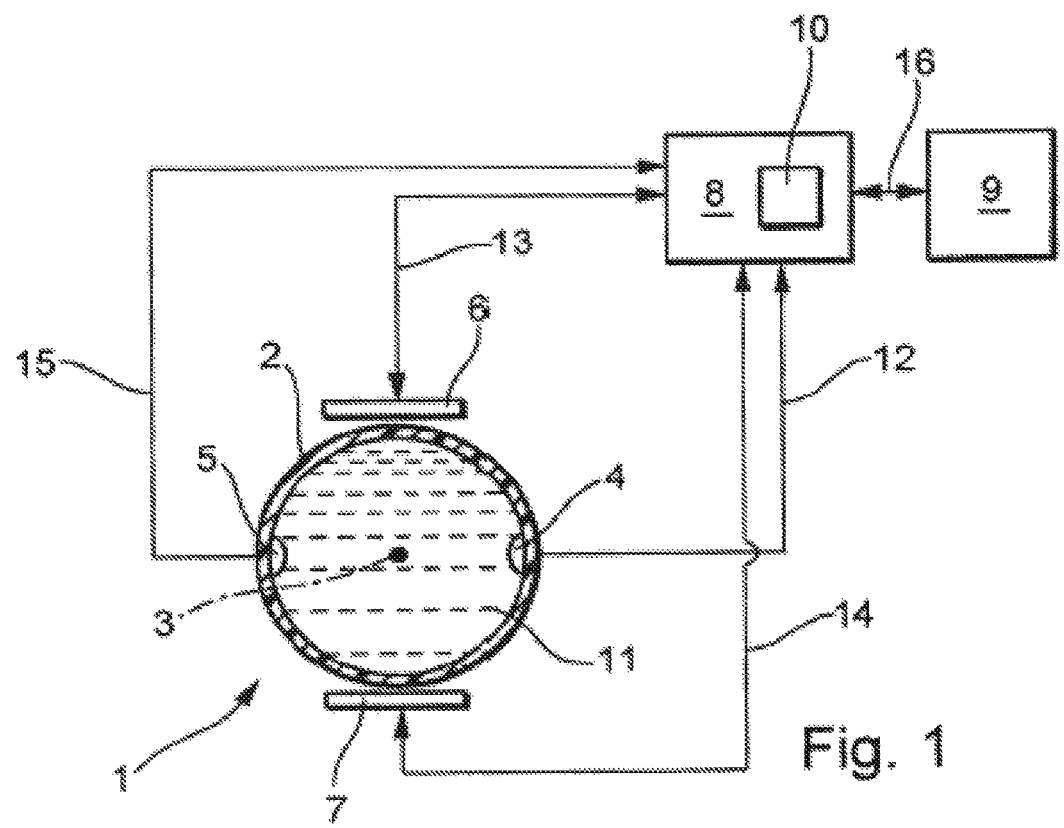
FIG. 1 is a schematic representation of a first embodiment of the apparatus of the invention.

FIG. 1 shows a schematic representation of a first embodiment of the apparatus 1 of the invention. The measuring tube 2 is flowed through by the fluid 11 in the direction of the longitudinal axis of the measuring tube 3. The fluid 11 is electrically conductive, at least to a slight extent. Measuring tube 2 is made of a non-conductive material, or at least it is lined on its inner surface with a non-conductive material.

The magnetic field B directed perpendicular to the flow direction of the fluid 11 is produced via the diametrically arranged coil arrangement 6, 7, respectively via two electromagnets. Under the influence of the magnetic field B, charge carriers located in the fluid 11 migrate, depending on polarity, to the two oppositely poled measuring electrodes 4, 5. The voltage forming on the measuring electrodes 4, 5 is proportional to the flow velocity of the fluid 11 averaged over the cross section of the measuring tube 2, i.e. it is a measure for the volume flow of the fluid 11 in the measuring tube 2. Measuring tube 2 is, moreover, connected via connecting elements, e.g. flanges (not shown), with a pipe system, through which the fluid 11 is flowing.

In the two illustrated cases, the measuring electrodes 4, 5 are located in direct contact with the fluid 11; the coupling can, however, also be capacitive in nature.

Measuring electrodes 4, 5 are connected with the control/evaluation unit 8 via connecting lines 12, 15. Connection between the coil arrangements 6, 7 and the control/evaluation unit 8 occurs via the connecting lines 13, 14. The control/evaluation unit 8 is connected via the connecting line 16 with an input/output unit 9. Evaluation/control unit 8 has a memory unit 10.

Figure 2:
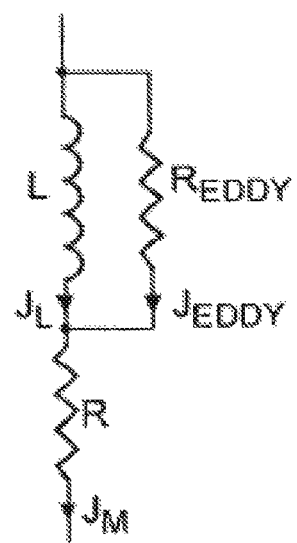
FIG. 2 is a greatly simplified equivalent circuit diagram of the coil arrangement.

In the case of an ideal magnet system, respectively in the case of an ideal coil arrangement 6, 7, the electrical current curve corresponds to the curve of the magnetic field B produced from the coil arrangement 6, 7. The coils of a coil arrangement 6, 7, as used in the case of magneto-inductive measuring transducers, usually have coil cores and/or pole shoes. The control/evaluating unit 8 supplies the coil arrangement 6, 7 with electrical current in such a manner that the magnetic field B periodically changes its direction. Ideally, in both half-periods, the coil current $I_L$ is constant, opposite and of equal magnitude. Due to eddy currents arising in the pole shoes and coil cores, this ideal case does not occur. Rather, the electrical current $I_M$ measured outside of the coil arrangement 6, 7 corresponds always to a sum electrical current $I_M$, which is composed of the coil current $I_L$ and the eddy current $I_{EDDY}$. Since the electrical current $I_M$ measured outside of the coil arrangement 6, 7 is always used by the control/evaluation unit 8 as control variable, the electrical current $I_M$ is, indeed, constant, not, however, the magnetic field B, which passes through the measuring tube 2. A corresponding equivalent circuit diagram of the coil arrangement 6, 7 is shown in FIG. 2.

According to the invention, the control/evaluation unit supplies the coil arrangement 6, 7 with an overvoltage during a delay phase, wherein the delay phase begins at the point in time of the reversal of the polarity of the magnetic field B and ends at the point in time of the beginning of the measuring phase. Over the duration of the measuring phase, the control/evaluation unit 8 supplies the coil arrangement 6, 7 with an essentially constant, holding voltage. According to the invention, the control/evaluation unit 8 controls the ratio of overvoltage to holding voltage to an essentially constant value. In an advantageous embodiment of the apparatus of the invention, the control/evaluation unit 8 controls the ratio of overvoltage to holding voltage by corresponding change of the overvoltage to an essentially constant value. Alternatively, the control/evaluation unit 8 controls the ratio of overvoltage to holding voltage to an essentially constant value by holding the duration of the delay phase to an at least approximately constant value.

Figure 3:
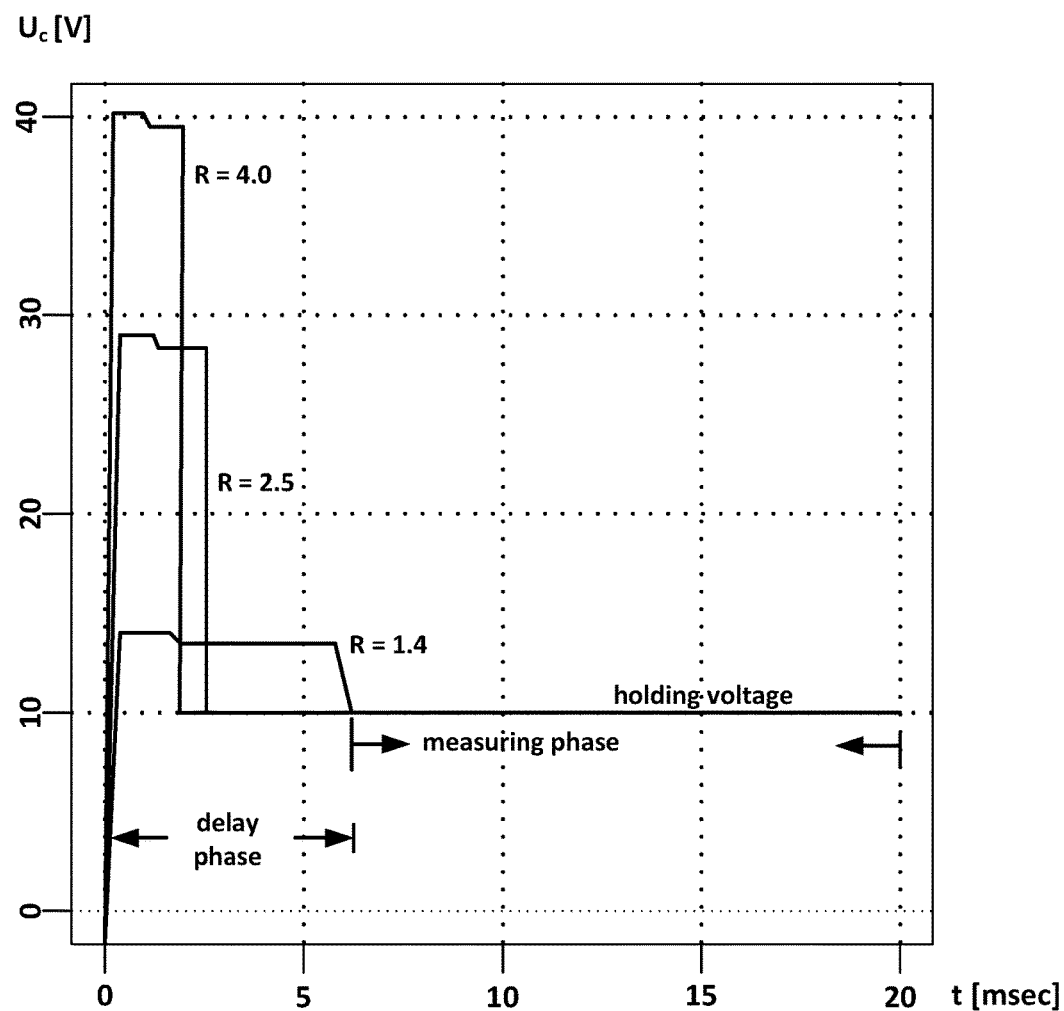
FIG. 3 is a graph of coil voltage U C versus time for different ratios of overvoltage to holding voltage.

FIG. 3 shows the voltage across the coil arrangement 6, 7 for three different ratios of overvoltage to holding voltage. The higher the ratio of overvoltage to holding voltage, the faster the constant holding voltage is reached and the faster the measuring phase can start. Since in explosion endangered regions the power supply is limited to a maximum allowable value, it is in the case of many cases of application in industrial measurements technology not possible to increase the overvoltage as much as desired.

Figure 4:
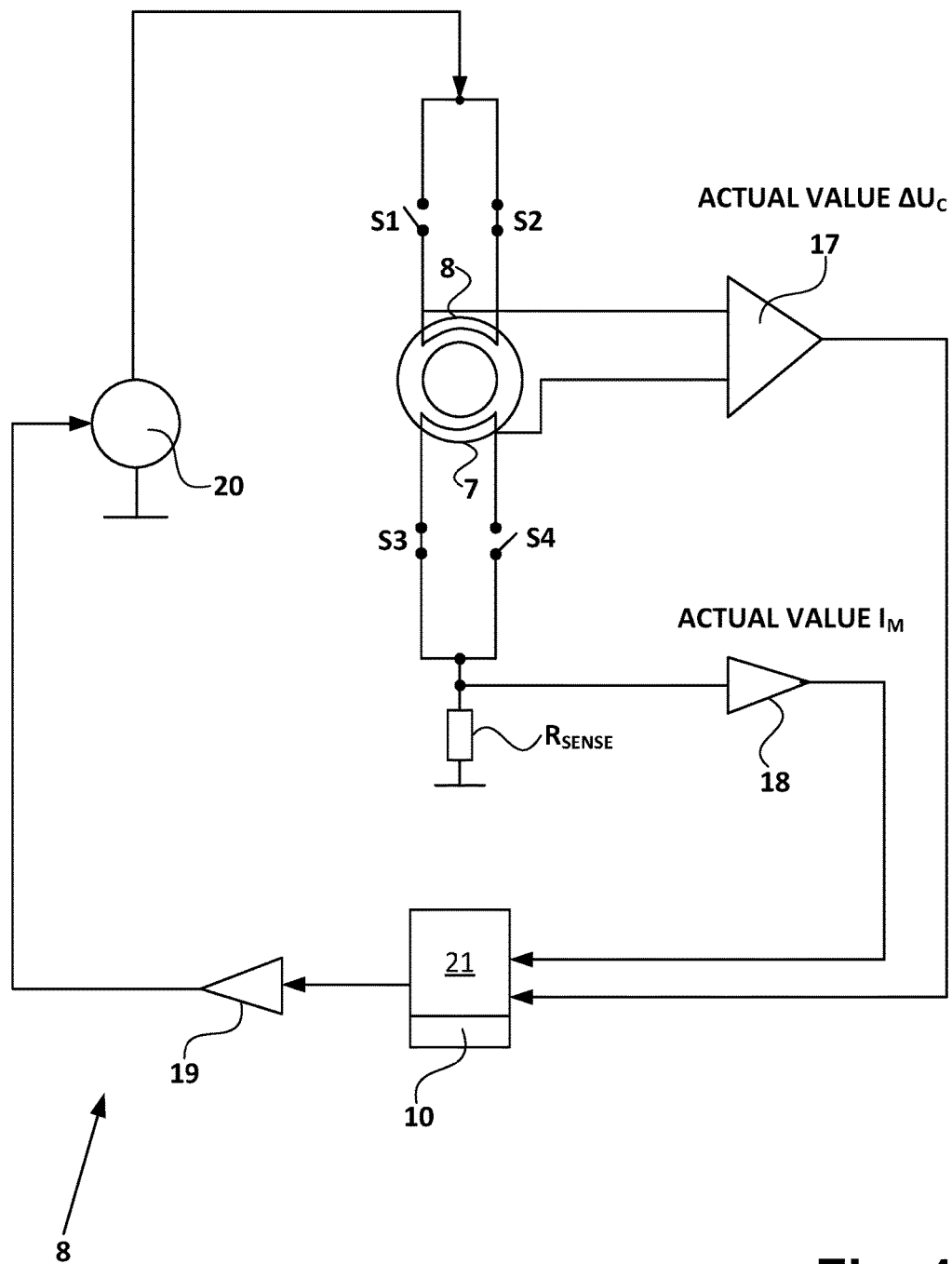
FIG. 4 is a block diagram of a preferred embodiment of the apparatus of the invention.

FIG. 4 shows a circuit arrangement, which is applied in the case of the magneto-inductive flow measuring device 1 of the invention and which is suitable for performing the method of the invention. As already mentioned, the magnetic field B of a magneto-inductive flow measuring device 1 is periodically reversed. For operating the magnetic field B, usually an H circuit is used: In the first half period, the two switches S2 and S3 are closed, and the two switches S1, S4 are open. In the half period following thereon, the two switches S2, S3 are opened, and the two switches S1, S4 are closed. As a result of the operating of the switches S1, S2, S3, S4, coil current $I_M$ of the coil arrangement 6, 7 measured outside of the coil arrangement 6, 7 flows in two sequential half-periods in opposite directions. Associated therewith is an alternation of the polarity of the magnetic field B.

The voltage difference $\Delta U_C$ of the voltages across the two coils of the coil arrangement 6, 7 is digitized by an A/D converter 17. The voltage difference $\Delta U_C$ is supplied to the microcontroller 21. The actual value of the coil current $I_M$ is measured via the resistor $R_{Sense}$, digitized by the A/D converter 18 and likewise supplied to the microcontroller 21.

According to the invention, the coil arrangement 6, 7 is supplied over the duration of the measuring phase with an essentially constant holding voltage, wherein the control/evaluation unit 8 controls the ratio of overvoltage to holding voltage to an essentially constant value. The ratio of overvoltage to holding voltage is stored in the memory unit 10. Based on the delivered voltage- and electrical current values, the microcontroller 21 calculates the ratio of overvoltage and holding voltage and controls the controllable voltage source 20 such that the ratio between overvoltage and holding voltage agrees with a setpoint value predetermined for the particular application. Provided between microcontroller 21 and the controllable voltage source is a D/A converter 19. Since the holding voltage must be constant, the holding of the ratio of overvoltage to holding voltage constant occurs by corresponding change of the overvoltage.

The setpoint value of the ratio of overvoltage to holding voltage is application dependent. If a high measuring speed is desired—, for example, because the volume flow has a high dynamic range—, then the predetermined value of the ratio is chosen as large as possible: The higher the overvoltage is, the smaller is the duration of the delay phase and the faster can measured values be provided in sequential measuring phases. Preferably, the control/evaluation unit 8, in the case of an application, in which due to a high dynamic range a high measuring speed is required, selects the predetermined value of the ratio of overvoltage to holding voltage as large as possible in the context of the available power.

Furthermore, an advantageous embodiment of the magneto-inductive flow measuring device provides that the control/evaluation unit 8, in the case of an application, which is located in an explosion endangered region, selects the predetermined value of the ratio of overvoltage to holding voltage sufficiently small that the power consumption allowable for the explosion endangered region is not exceeded.

If the two above mentioned limit ratios are simultaneously to be fulfilled, then the control/evaluation unit must reach a compromise. Besides the specification of values for the ratio of overvoltage to holding voltage by the control/evaluation unit, there is also the opportunity that the user can provide corresponding inputs to fit the setpoint value to the real case of application.

The invention claimed is:

1. An apparatus for measuring volume flow of a fluid flowing through a measuring tube in the direction of a longitudinal axis of the measuring tube, comprising:
    a coil arrangement;
    at least two measuring electrodes coupling with the fluid; and
    a control unit, which in connection with said coil arrangement produces a magnetic field periodically changing its polarity and extending essentially transversely to said longitudinal axis of the measuring tube, wherein:
    said control unit during a measuring phase at an essentially constant magnetic field determines the volume flow of the fluid in the measuring tube based on a voltage induced in said measuring electrodes;
    said control unit supplies said coil arrangement with an overvoltage during a delay phase, wherein the delay phase begins at a point in time of a reversal of the polarity of the magnetic field and ends at the point in time of a beginning of the measuring phase; and
    said control unit supplies said coil arrangement with an essentially constant holding voltage over a duration of the measuring phase, said control unit controls a ratio of overvoltage to holding voltage to an essentially constant value.

2. The apparatus as claimed in claim 1, wherein:
    said control unit controls the ratio of the overvoltage to holding voltage to an essentially constant value by a corresponding change of the overvoltage.

3. The apparatus as claimed in claim 1, wherein:
    said control unit controls the ratio of the overvoltage to holding voltage to an essentially constant value by holding duration of the delay phase to an at least approximately constant value.

4. The apparatus as claimed in claim 1, wherein:
    said predetermined value of the ratio of the overvoltage to holding voltage is greater than 1.

5. The apparatus as claimed in claim 4, wherein:
    said predetermined value of the ratio of the overvoltage to holding voltage lies preferably between 2 and 10.

6. The apparatus as claimed in claim 1, wherein:
    said predetermined value of the ratio of the overvoltage to holding voltage depends on applied sensor type or on the application, in which the sensor type is applied.

7. The apparatus as claimed in claim 1, wherein:
    said control unit, in a case of an application, in which due to a high dynamic range a high measuring speed is required, selects the predetermined value of the ratio of the overvoltage to holding voltage as high as possible in a context of an available power.

8. The apparatus as claimed in claim 1, wherein:
    said control unit, in the case of an application, which is located in an explosion endangered region, selects the predetermined value of the ratio of overvoltage to holding voltage sufficiently low that the power consumption allowable for the explosion endangered region is not exceeded.

9. The apparatus as claimed in claim 1, further comprising:
    a memory unit, in which predetermined values for the ratio of overvoltage to holding voltage are furnished as a function of a respective sensor type or a respective application.

10. A method for measuring volume flow of a fluid flowing through a measuring tube in a direction of a longitudinal axis with an apparatus comprising: a coil arrangement; at least two measuring electrodes coupling with the fluid; and a control unit, which in connection with the coil arrangement produces a magnetic field periodically changing its polarity and extending essentially transversely to the longitudinal axis of the measuring tube, the method comprising the steps of:

during a measuring phase at an essentially constant magnetic field the control unit determines the volume flow of the fluid in the measuring tube based on a voltage induced in the measuring electrodes;

supplying the coil arrangement with an overvoltage during a delay phase, wherein the delay phase begins at a point in time of a reversal of the polarity of the magnetic field and ends at the point in time of a beginning of the measuring phase; and supplying the coil arrangement with an essentially constant holding voltage over the duration of the measuring phase, wherein the ratio of overvoltage to holding voltage is controlled to an essentially constant value.

\* \* \* \* \*